Jan. 17, 1961  W. W. MULTANEN  2,968,113
FISH LURE
Filed Sept. 25, 1959

WILLIAM W. MULTANEN
INVENTOR
HUEBNER & WORREL
ATTORNEYS
BY *Richard M. Worrel*

United States Patent Office 2,968,113
Patented Jan. 17, 1961

2,968,113

FISH LURE

William W. Multanen, 3060 Mission Drive,
Santa Cruz, Calif.

Filed Sept. 25, 1959, Ser. No. 842,485

6 Claims. (Cl. 43—42.06)

The present invention relates to a fish lure and more particularly to a lure which exposes natural or fresh bait to the fish for smell or taste while concealing a fishhook in the lure, which requires the fish to place substantially the entire lure including the hook in its mouth in order to obtain the bait, and which is adapted to release the hook to impale the fish when the fish grasps the lure in its mouth.

Efforts have been made in the past completely or partially to conceal or enclose a fishhook in a lure body thereby to render the lure safer to handle, to conceal the hook from the fish, and to minimize entanglement of the hook with weeds, or the like, encountered during movement of the lure through the water. Usually such lures have consisted of a hook releasably retractably received in a lure body which simulates live bait. Insofar as is known, conventional lures of this type have not utilized fresh bait in such a manner as to expose it directly to the fish. Accordingly, the primary attraction of this type of lure to the fish has been its appearance rather than the smell or taste of the fresh bait.

Furthermore, the association of the fishhook and the lure body of such lures has permitted a fish to nibble at the body or even to bite off a portion thereof without being impaled on the hook. If the lure body is broken during use, it is the usual practice to discard the entire lure. Also, the relative size and shape of bait-simulating lure bodies usually prevents compact packaging thereof.

It is an object of the present invention to provide a fish lure in which the fishhook is normally concealed, which employs natural or fresh bait directly exposed to the fish, and which forces the fish to place substantially the entire lure in its mouth to obtain the bait whereupon the hook emerges and impales the fish.

Another object is to provide a fish lure having a fishhook retractably, concealed in a lure body but adapted to extend outwardly from the body for impaling a fish when the fish grasps the lure in its mouth.

Another object is to provide a fish lure in which fresh bait and a fishhook are releasably held in assembled association with a lure body by a common means.

Another object is to provide a fish lure which is safer to handle than conventional lures.

Another object is to minimize entanglement of a fish lure with weeds, and the like, during movement of the lure through water.

Another object is to provide a fish lure which is economical to manufacture.

Another object is to provide a fish lure which readily can be produced in various bright and attractive colors.

Another object is to provide a fish lure which is easily and compactly packaged.

Another object is to provide a fish lure having easily replaceable parts and which is easy to assemble and disassemble.

These, together with other objects, will become more fully apparent upon reference to the following description and accompanying drawing.

Figure 1:
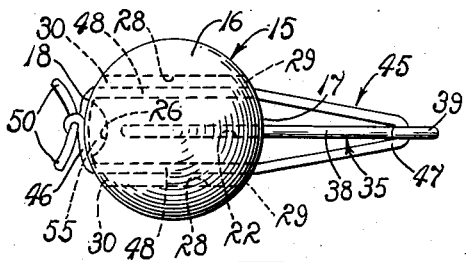
Fig. 1 is a side view of a fish lure embodying the principles of the present invention, said lure including a fishhook releasably retractably held in a lure body by an elastic band.

Referring more particularly to the drawing, the fish lure of the present invention includes a rigid, spherical, body 15 having a peripheral surface 16 and providing forward and rearward portions 17 and 18, so indicated for purposes of subsequent reference. The body is preferably made of relatively lightweight and economical material, such as plastic, and is thereby readily suited to manufacture in a variety of bright colors for increasing the attractiveness of the lure.

The body 15 has a U-shaped slot 22 extended therein in a plane substantially diametrically related to the body. The slot has a pair of opposed, substantially parallel, flat inside walls 23 interconnected by a narrow arcuate inside wall 24, and further provides an arcuate opening 25 at the forward portion 17 of the body and communicating exteriorly thereof. The body also has a concave recess 26 located substantially diametrically opposite to the opening 25 of the slot 22. Further, the body provides elongated, substantially straight bores 28 on opposite sides of the slot and the recess and extended entirely through the body so as to have opposite open ends 29 and 30 respectively adjacent to the slot and to the recess.

A single-prong fishhook 35 includes a return bent hook portion 36 terminating in a barbed point 37, an elongated shank 38 integral with the hook portion and extended therefrom, and an eyelet 39 integral with the shank at the opposite end thereof from the hook portion, all of a well-known form. The slot 22 in the body has a minimum transverse dimension between the flat walls 23 slightly wider than the common diameter of the shank and hook portion while the maximum transverse dimension of the slot is slightly greater than the maximum width of the hook portion. Accordingly, the hook portion of the fishhook is releasably slidably fitted in the slot. The slot has a depth slightly greater than the length of the return bend in the fishhook so that when the hook portion is in seated engagement with the arcuate wall 24 of the slot, the body completely conceals the hook portion and the point. In this concealed position, the shank of the fishhook extends forwardly outwardly from the body 15, and the eyelet is located substantially on an axis of the body passing through the recess 26.

An endless elastic band 45, preferably a conventional rubber band, is threaded through the bores 28 of the body 15. The band thus has opposite, rear and front looped portions 46 and 47 respectively extended across the recess 26 at the rear portion 18 of the body and through the eyelet 39 of the fishhook 35 in spaced relation to the forward portion 17 of the body. Further, the band has intermediate portions 48 interconnecting the looped portions and individually extended through the bores. Inasmuch as the band is preferably and most conveniently formed from a conventional rubber band which is cut to facilitate its threading through the body in the described manner, a knot 49 is provided in the rear looped portion thereby leaving free band ends 50 extended rearwardly of the body. When the fishhook is in the slot 22, the band is stretched outwardly from its relaxed position by the hook and is therefore under tension. The rear looped portion is urged tightly against the rear portion of the body in spanning relation to the recess and the fishhook is releasably held in the slot.

The subject lure employs fresh bait 55, such as a piece of meat or cheese, positioned in the recess 26 underneath the rear looped portion 46. Because of the described tension of the band 45, it is evident that the bait is releasably held in the recess by the band. Accordingly, the band serves to hold the bait and the fishhook in the described assembled relationship with the body. The lure is attached to a fishing rod, not shown, by means of a fish line 56 connected to the eyelet 39 of the fishhook 35.

Second form

The second form of the subject invention is similar to the first form in the provision of a rigid, ball-shaped, spherical body 70. The body has a forward portion 71 and bores 72 extended through the body, as before.

Figure 9:
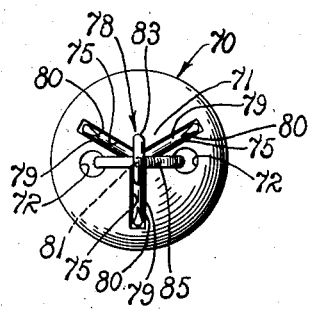
Fig. 9 is a view similar to Fig. 4 but showing a modification of the subject lure.

However, the second form of the lure is distinguished from the first form in providing a plurality of slots 75 individually located in planes diametrically related to the body and intersecting in an axis of the body passing through a recess, not shown, at the rear of the body. The slots are in substantially equally, angularly spaced relation to each other. As is evident by reference to Fig. 9, the bores 72 are located on opposite sides of one of these slots and individually adjacent to the other slots.

A multi-prong fishhook 78 provides a plurality of return bent hook portions 79 corresponding in number and angular spacing to the slots 75 and individually releasably received in the slots 75. The hook portions have barbed points 80, and a common shank 81 connected to the hook portions rearwardly outwardly extended from the body. An eyelet 83 is provided on the terminal end of the shank and is located generally on said axis of the body when the hook portions are seated in the slots. It is believed understood that the body conceals all of the hook portions when the same are fully retracted in the body. It is further to be noted that while three slots and prongs are illustrated, any other suitable number could be employed. Also while the slots are shown in equal angular relation, any other desired angular relation could be provided to accommodate the fishhook utilized.

An endless elastic band 85 is threaded through the eyelet 83 and the bores 72 and is tensioned around the rear portion of the body 70 in overlapping relation to a recess, not shown, but in the same manner as described in connection with the first form of the invention. Bait is placed in such recess under the band so that the band dependably, although releasably, holds the bait and the hook in association with the body, as with said first form.

Operation

The operation of the described embodiments of the subject invention is believed to be readily apparent and is briefly summarized at this point.

Figure 2:
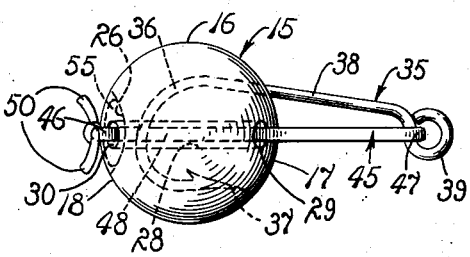
Fig. 2 is another side view of the subject lure taken from a position 90° displaced from the view of Fig. 1.
Figure 3:
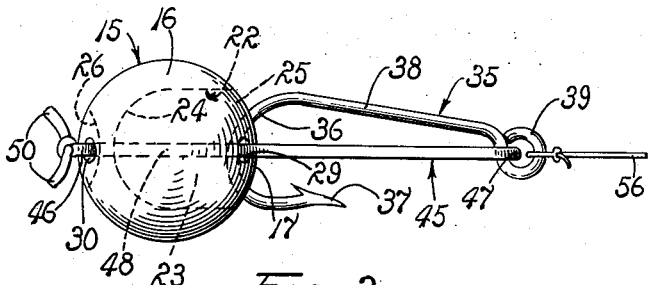
Fig. 3 is a view similar to Fig. 2 but showing the fishhook extended from the lure body.
Figure 4:
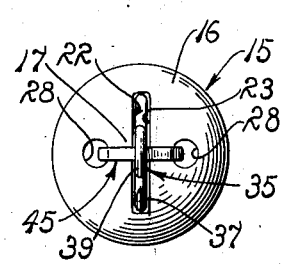
Fig. 4 is a front view of the lure of the present invention.
Figure 5:
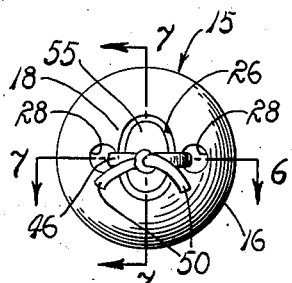
Fig. 5 is a rear view of the subject lure.
Figure 6:
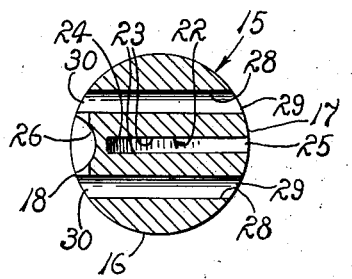
Fig. 6 is a transverse section taken on line 6—6 of Fig. 5 but with the fishhook, bait, and band removed.
Figure 7:
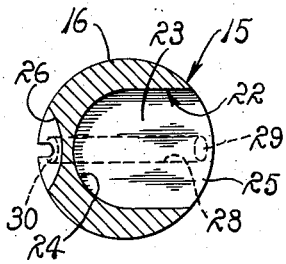
Fig. 7 is a transverse section taken on line 7—7 of Fig. 5 and also having the fishhook, bait, and band removed.

In describing the operation of the subject lure, detailed reference is made only to the first form of the invention because both forms operate in essentially the same manner. With the lure assembled as illustrated in Fig. 2, a fish line 56 is connected to the eyelet 39. The lure is thrown or cast into the water and is preferably drawn therethrough for the purpose of attracting a fish, as 100.

In this regard it is to be noted that the hook portion 36 of the fishhook 35 is retracted into the slot 22 and is thus concealed within the body 15. The fish is thus not frightened away by the appearance of the hook nor does the lure become entangled with weeds, and the like, during travel through the water.

The fish 100 are attracted to the lure by its bright color and by the band ends 50 which gyrate in a manner roughly simulative of live bait. Of primary attraction, however, is the bait 55 which is directly exposed to the fish since it is held against the outside of the body 15 by the band 45. The fish can therefore see, smell and taste the bait. However, since the bait is located within the recess 26 and does not project from the surface 16 of the body, fish are unable to remove, or otherwise obtain, the bait simply by grasping the bait from the rear of the body. This is because the shape and size of the fish's mouth 101 is not sufficiently diminutive to reach directly into the recess and grab the bait. Instead, the jaws 102 of the fish, in attempting to nibble at the bait, merely engage the rear portion 18 of the body and slide thereover and eventually off in trying to close around the bait.

Figure 8:
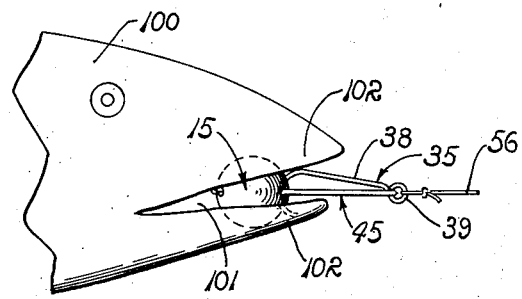
Fig. 8 is a fragmentary side view of a fish grasping the lure of the subject invention.

The fish 100 is thus forced to place the entire lure within its mouth 101 in attempting to take the bait 55. When this occurs, as illustrated in Fig. 8, and the fish bites down on the body 15, the resultant drag on the body pulls the body rearwardly relative to the line 56 and the fishhook 35. The band 45 readily stretches to allow the body and the fishhook to separate whereupon the barbed point 37 and the hook portion 36 of the fishhook emerge from the slot 55. Because such drag is applied rather suddenly, the fishhook is rapidly pulled out of the body and through the mouth of the fish whereupon the fish is caught on the line. Even if the fish bites down hard on the body 15 and crushes, or otherwise breaks, the body, it is evident that the fish will still be captured since the hook has impaled the fish's mouth.

In the event the fish 100 succeeds in removing the body 15 without becoming snagged on the fishhook 35, the fishhook remains connected to the line and is not lost. In such an event, another body is provided and assembled with the fishhook by means of another band 45, both of which are expendable.

In order to increase the assurance of impaling the fish's mouth 101, a lure embodying the second form of the present invention may be employed. With this type of lure, the several hook portions 79 emerge from the body 70 when the fish grasps the body in its mouth and pulls rearwardly on the body relative to the fishhook 78. This eliminates the possibility of the fish biting onto the body in such a manner that the plane of a single prong fishhook, as 35, is disposed between the upper and lower jaws 102 of the fish's mouth.

From the foregoing it will be evident that a fish lure has been provided which offers several distinctive advantages. The lure mounts natural bait so that it is exposed to the fish while preventing the fish from directly obtaining the bait without placing the entire lure in its mouth. Further, the lure mounts a fishhook in a concealed position and in such a manner that when the fish grasps the lure between its jaws, the fishhook is caused to emerge and to impale the fish. Of practical significance is the assembly of the bait, the fishhook, and the lure body by a common elastic band.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a fish lure, a lure body having a slot therein opening outwardly of the body, a fishhook including a return bent hook portion releasably received in the slot with the body concealing said hooked portion, the fishhook also including an end portion outwardly extended from the hook portion and being in spaced relation to the body, the body on the opposite side thereof from the end portion of the fishhook being adapted to have bait positioned thereagainst, and elastic means connected to the fishhook and adapted to engage the bait for releasably urging the bait against the body and the fishhook into the slot.

2. In a fish lure, a lure body having a slot therein opening outwardly of the body, a fishhook including a return bent hook portion releasably received in the slot with the body concealing said hook portion, the fishhook also including an end portion integral with the hook portion and extended outwardly from the body, and an elastic tension member interconnecting the body and said end portion of the fishhook for releasably retaining the fishhook in the slot, wherein the end portion of the fishhook includes an eyelet in outwardly spaced relation to the body, wherein the body has a portion substantially diametrically opposite to the end portion of the fishhook, and wherein the tension member is endless and is extended through the eyelet and around said diametrically opposite portion of the body.

3. The fish lure of claim 2 wherein the body has elongated bores extended entirely therethrough on opposite sides of the slot, and wherein the tension member has portions individually extended through the bores.

4. The fish lure of claim 2 wherein the tension member has a section in opposed relation to said diametrically opposite portion of the body, and wherein said diametrically opposite portion of the body is adapted to have bait held thereagainst by said section of the tension member.

5. A fish lure comprising a rigid spherical body having a slot located in a plane disposed substantially diametrically of the body and opening outwardly thereof, the body having bores on opposite sides of the slot extended entirely through the body, the body also having a recess adapted to have bait positioned therein located between the bores and substantially diametrically opposite to the slot; a fishhook having a return bent hook portion releasably slidably fitted in the slot, and a shank extended outwardly from the return bent portion and terminating in an eyelet in outwardly spaced relation to the body; and an endless elastic band threaded through the bores having closed loops extended oppositely outwardly from the body, one of the loops spanning said recess and adapted to overlap such bait, and the other loop being extended through the eyelet of the fishhook, the band being under tension thereby releasably to hold the bait and fishhook in the recess and the slot, respectively.

6. A fish lure comprising a spherical body having a plurality of slots radially outwardly extended from a common axis extended diametrically of the body and located in planes disposed substantially diametrically of the body, the slots opening outwardly of the body, the body having bores on opposite sides of one of the slots extended entirely through the body, the body also having a recess adapted to have bait positioned therein located between the bores and substantially diametrically opposite to the slots, said axis passing through the recess; a fishhook having return bent hook portions individually releasably slidably fitted in the slots, and a shank extended outwardly from the return bent portions and terminating in an eyelet in outwardly spaced relation to the body and in alignment with said axis; and an endless elastic band threaded through the bores having closed loops oppositely outwardly extended from the body, one of the loops spanning said recess and adapted to overlap such bait, and the other loop being extended through the eyelet of the fishhook, the band being under tension thereby releasably to hold the bait and fishhook in the recess and the slot, respectively.

References Cited in the file of this patent

UNITED STATES PATENTS

| | | |
|---|---|---|
| 2,520,544 | Hook | Aug. 29, 1950 |
| 2,522,292 | Modesto | Sept. 12, 1950 |
| 2,568,547 | Hoffman | Sept. 18, 1951 |
| 2,743,547 | Horst | May 1, 1956 |